(12) United States Patent
Griggs et al.

(10) Patent No.: US 7,211,808 B2
(45) Date of Patent: May 1, 2007

(54) METHOD AND ELEMENT FOR MEASURING RADIATION

(75) Inventors: James H. Griggs, Rochester, NY (US); David J. Steklenski, Rochester, NY (US); Michael T. Wolf, Rochester, NY (US); John G. Attwood, Cheshire, CT (US)

(73) Assignee: Eastman Kodak Company, Rochester, NY (US)

( * ) Notice: Subject to any disclaimer, the term of this patent is extended or adjusted under 35 U.S.C. 154(b) by 299 days.

(21) Appl. No.: 10/949,595

(22) Filed: Sep. 24, 2004

(65) Prior Publication Data

US 2005/0061991 A1  Mar. 24, 2005

Related U.S. Application Data

(63) Continuation-in-part of application No. 09/995,081, filed on Nov. 27, 2001, now Pat. No. 6,892,948, and a continuation-in-part of application No. 09/995,088, filed on Nov. 27, 2001, now abandoned.

(51) Int. Cl.
*G01T 1/04* (2006.01)

(52) U.S. Cl. .................................... 250/472.1
(58) Field of Classification Search ............. 250/472.1
See application file for complete search history.

(56) References Cited

U.S. PATENT DOCUMENTS

| | | | |
|---|---|---|---|
| 3,673,107 A | | 6/1972 | Peters |
| 4,146,782 A | | 3/1979 | Barnich |
| 4,542,528 A | | 9/1985 | Sanner et al. |
| 4,578,571 A | | 3/1986 | Williams |
| 4,668,714 A | | 5/1987 | Morita et al. |
| 5,030,834 A | * | 7/1991 | Lindmayer et al. ...... 250/484.5 |
| 5,066,863 A | | 11/1991 | Hanisch et al. |
| 5,179,281 A | * | 1/1993 | Tawil et al. ................. 250/337 |
| 5,364,593 A | | 11/1994 | Mihaylov et al. |
| 5,451,792 A | * | 9/1995 | Maguire et al. ......... 250/474.1 |
| 5,572,027 A | * | 11/1996 | Tawil et al. ............. 250/336.1 |
| 5,637,876 A | | 6/1997 | Donahue et al. |
| 5,767,520 A | | 6/1998 | Donahue et al. |
| 5,777,341 A | | 7/1998 | Seiwatz et al. |
| 5,910,847 A | | 6/1999 | Van der Werf et al. |
| 6,232,610 B1 | | 5/2001 | Pageau et al. |
| 6,268,602 B1 | | 7/2001 | Seiwatz et al. |
| 6,284,198 B1 | | 9/2001 | Kirollos et al. |
| 6,398,710 B1 | | 6/2002 | Ishikawa et al. |
| 6,563,565 B2 | | 5/2003 | Nishi |
| 6,892,948 B2 | * | 5/2005 | Steklenski et al. .......... 235/487 |
| 2003/0080303 A1 | | 5/2003 | Hayashi et al. |
| 2003/0098354 A1 | | 5/2003 | Steklenski et al. |
| 2004/0084631 A1 | * | 5/2004 | Spoonhower et al. .... 250/474.1 |
| 2005/0061991 A1 | * | 3/2005 | Griggs et al. ............ 250/472.1 |

FOREIGN PATENT DOCUMENTS

| | | |
|---|---|---|
| DE | 196 37 471 A1 | 3/1997 |
| EP | 0 389 113 A2 | 9/1990 |
| WO | 99/00677 | 1/1999 |

OTHER PUBLICATIONS

Kojima et al., "Alanine Dosimeters Using Polymers as Binders", 1986, Appl. Radiat. Isot, vol. 37, No. 6, pp. 517-520.
Japanese Patent Abstract, JP 01-046677 A.
Japanese Patent Abstract, JP 61-057878 A.
Japanese Patent Abstract, JP 01-102388.
Japanese Patent Abstract, JP 64-025085.
Japanese Patent Abstract, JP 64-080895.

* cited by examiner

*Primary Examiner*—David Porta
*Assistant Examiner*—Mark R. Gaworecki
(74) *Attorney, Agent, or Firm*—Kathleen Neuner Manne; Lynne M. Blank

(57) ABSTRACT

A dosimeter and method of measuring an absorbed dose of ionizing radiation using the dosimeter comprising at least one first region containing a radiation sensitive material, and a second region containing an identification mark are described, wherein the method includes the steps of: providing a first region including a radiation sensitive material capable of measuring an absorbed dose of ionizing radiation; providing a second region bearing an identification mark; exposing at least the first region to a dose of ionizing radiation; and reading the signal from the first region. The dosimeter can be used to track location and irradiation of an associated good.

35 Claims, No Drawings

METHOD AND ELEMENT FOR MEASURING RADIATION

CROSS-REFERNCE TO RELATED APPLICATION

This application is a continuation-in-part of and claims priority to U.S. patent application Ser. No. 09/995,081 now U.S. Pat. No. 6,892,948, and Ser. No. 09/995,088 now abandoned, both filed 27 Nov. 2001, and both of which are incorporated herein by reference.

FIELD OF THE INVENTION

The present invention relates to a dosimeter and a method of using the dosimeter to provide accurate and traceable measurement of doses of ionization radiation in a prescribed area of interest. The invention also relates to a method of identifying the source of the dosimeter and other information about the dosimeter, such as providing an identification marker on the dosimeter.

BACKGROUND OF THE INVENTION

There are various processes that utilize radiation, for example, sterilization of materials; radiation therapy of biological subjects, including blood, people, and animals; food and crop irradiation for keeping properties or removal of pests, for example, pasteurization; alteration of material properties, for example, polymerization or cross-linking; quality checking, such as for cables, gel used in electrode surgery, and curing of inks in food labeling; and security scanning. These processes have a need to verify the administration of radiation, and/or the dosage of radiation administered.

There are a large number of different methods available to determine a dosage of radiation received by a subject or emitted from a material or machine, which methods are referred to as dosimetry. For example, methods of determining radiation doses can include, but are not limited to, ion dosimetry (ionization in air), calorimetry (for example, the determination of radiation-induced heat in carbon or metals), thermoluminescence dosimetry (luminescence in solids), and amino acid dosimetry.

The formation of radicals in solid organic substances on irradiation has been observed and the concentration of these radicals is proportional to the absorbed dose of radiation over a wide range of radiation doses. The radical concentrations can be determined easily by means of electron spin resonance (EPR) spectroscopy. Amino acids, for example, alanine, have been widely used for this purpose due to availability and the relative simplicity of incorporating amino acids into practical dosimeters.

Amino acid dosimetry is an accepted method to determine the radiation dose of different irradiation processes. On irradiating with ionizing radiation, radicals are produced in amino acids like alanine, for example, L-alanine or L-methylalanine, and the radicals are stable for long periods of time. The stability of the radicals is mainly due to the inhibition of radical-radical recombinations in the crystalline structure of the amino acid material, which prevents the migration of large molecule fragments. Non-destructive evaluation of the radical concentration in the amino acid can be done using EPR spectroscopy.

The use of EPR to determine an amount of radiation dose received by an amino acid requires a sensitive, robust and reliable instrument that can be serviced by a laboratory worker. A useful instrument provides such features as automated procedures for calibration and measurement of radiation dosages. Careful adjustment of an EPR spectrometer and the selection of suitable dosimeters allow the determination of dose rates in a range from 2 Gy to 200 kGy with a total uncertainty of 3.5% (confidence level of 95%).

Amino acid dosimeters are small, stable, and easy to handle. They are characterized by their large measuring range and a low sensitivity to temperature and humidity. This allows for their application in all types of radiation therapy, including the irradiation of blood, as well as in industrial facilities for irradiation of food and other goods. An advantage of the use of alanine dosimeters over inorganic dosimeter systems when measuring dosages applied to such organic materials is that the radiation absorption in the alanine-based dosimeters is closer to the radiation absorption in the organic materials being irradiated. This allows for improved dose measurement in such circumstances.

An amino acid dosimeter system can be used for reference and routine dosimetry due to its high quality and low costs. An example of an amino acid dosimeter is that described in U.S. Pat. No. 3,673,107, wherein the dosimeter includes amine salts or organic acids.

Alanine dosimeters are well known in the art. For example, in the reference: T. Kojima et al., "Alanine Dosimeters Using Polymers As Binders," Applied Radiation & Isotopes, vol. 37, No. 6 (1986), Pergamon Journals Ltd., pp. 517–520, there are numerous references to alanine dosimeters made in pellet, rod, and film formats. Dosimeters have been made both by industrial laboratories and at academic institutions. These dosimeters can be in the form of molded pellets or rods. The alanine is generally blended with a synthetic or natural rubber, compounded, and molded under pressure to form a variety of shapes, as described, for example, in U.S. Pat. No. 4,668,714, JP 203276B, JP 01-025085A, and JP 61-578788. There are also references in the literature to extruded alanine films, as in JP 01-102388A. These extruded products, while working well, have several deficiencies. Their manufacture often requires the use of high pressures and temperatures during the molding process, requiring molding equipment that limits the sizes and shapes of available products. Molded dosimeters are also limited in that only moldable polymeric binders may be used. The use of molded dosimeters is also somewhat restrictive, as the size of the dosimeters tends to be very small, leading to difficulties in handling, and possibly loss during irradiation or subsequent handling of associated irradiated materials.

A potential solution to these difficulties would be an amino acid dosimeter formed of a length and width that allow easy handling, for example, coated onto a flexible support wherein the support serves to hold the amino acid and provide the user with a material that is easy to handle. Such a coated dosimeter has been described in DE 19637471A, wherein the alanine is coated from one of two specific binders, a polyoctenamer or polystyrene. Both of these binders are brittle materials and make the coating of thick alanine layers with good mechanical properties very difficult, especially when the thickness of the dosimeter layer is >100 microns. The ability to bend and shape the amino acid dosimeter coated on a support can be very important in some applications, and the lack of flexibility is a significant limitation of the coated dosimeters described in the art.

The response of an alanine dosimeter to ionizing radiation is proportional to the amount of alanine coated on the dosimeter. While within a given manufacturing batch the coated coverage may be very uniform, batch-to-batch variation makes it very important that dosimeters from a given batch be identifiable so calibration standards can be developed and used. Identification of one dosimeter from another can also be important, in case the dosimeter is separated from the goods with which it is meant to be associated. Such identification information for film dosimeters has been placed on film holders, as taught in U.S. Pat. No. 6,232,610.

Radiation processing and dose traceability are an integral part of the quality assurance of many fields, for example, medical products, including blood processing; food products, including tobacco, milk, and grains where the radiation is used for sterilization or pest control; and adhesives and inks, where the radiation is used for cross-linking or drying processes. Accurate quantitative dosimeters are important in optimizing radiation processing as well as in providing quality assurance for an item or product that has been irradiated. There is a further need to link the dosimeter to the irradiated product throughout manufacture, shipping, and possibly even usage by the consumer.

It would be useful to have a reliable method of measuring an absorbed dose of ionizing radiation, such as a dosimeter, wherein the dosimeter bears an identification mark that identifies the source and origin of the dosimeter, uniquely identifies the dosimeter from all other dosimeters, or both. It would further be useful to have a dosimeter that is flexible, easily handled, and reliably associated with a particular irradiated good.

SUMMARY OF THE INVENTION

A dosimeter is disclosed, wherein the dosimeter comprises at least one first region comprising a coated radiation absorbing material capable of measuring an absorbed dose of ionizing radiation, and at least one identification region comprising an identification mark. The dosimeter can be used to measure radiation levels to which an associated good is exposed, and to track the good.

ADVANTAGES

The dosimeter as described herein can be flexible, can be formed in or on a variety of shapes for ease in handling, can be reliably associated with an irradiated good, can readily be identified against all other dosimeters, can be used to track an associated good, and can be identified as to source and origin, allowing for accurate interpretation of irradiation data.

DETAILED DESCRIPTION OF THE INVENTION

Dosimeters can be formed of many materials. For example, a dosimeter can include an amino acid, can be dye based, can be radiochromic, can be cyanomic, or can be thermoluminescent. The materials for each of these types of dosimeters can be coated to form a layer of radiation measuring material. The layer of radiation measuring material can form a dosimeter, or can be attached to or placed in a support to form a dosimeter.

The radiation measuring material layer can be formed with a binder. The binder can be chosen such that the layer is flexible or hard. The binder containing the dosimeter material can be formed into a layer of any desirable thickness. The capability of the layer for radiation measurement is a function of the thickness of the layer and the concentration of the radiation measuring material in the layer. The radiation measuring layer can be a composite of two or more layers, wherein at least one layer includes the radiation measuring material with a binder. The remaining one or more layers can include binder, radiation measuring material, or any material which does not negatively effect the ability of the radiation measuring material to accurately measure radiation, or a combination thereof. Any materials used in the radiation absorbing material layer do not form free radicals that would interfere with the radiation absorbing material signal upon exposure to ionizing radiation. Additional layers can provide support when the radiation measuring layer alone is to function as a dosimeter. One or more additional material can form a protective layer over the radiation measuring material to protect it from damage by the environment, handling, or accidental impact. The materials forming the protective layer can be transparent.

The radiation absorbing material layer can be coated on, attached to, or placed in a support. If the radiation absorbing material layer is coated independently, it can be attached to a support by use of adhesive or mechanical attachments, for example, clips, pins, or rivets. The support can be formed such that it has an area for accepting a formed layer of radiation absorbing material, for example, a depression or a slot. The radiation absorbing material layer can be retained in the support by the use of adhesive or mechanical attachments. Preferably, the radiation absorbing material is viewable when incorporated into the support.

Important to the manufacture of practical, coated, amino acid dosimeters such as alanine dosimeters is the selection of binder materials that allow the coating of high fractions of amino acid in the radiation absorbing material layer, and yet are flexible enough to allow the layer to bend without cracking or breaking when coated at various thickness, including thickness greater than 100 microns. Binders such as the polystyrene, known in the art, are too brittle to allow a coating of thick layers. Far better are elastomeric binders that have high coefficients of elasticity and bond well both to plastic substrates and the amino acid. Examples of such binders include solvent soluble polyesters, vinyl elastomers such as ethylene-vinylacetate copolymers, alkyl methacrylates and alkyl acrylates (propyl and above), and polyurethanes. The polyurethane binders are especially preferred for their excellent solvent solubility and high-level of adhesion to many plastic supports. Particularly preferred are the aromatic polyurethanes represented by Estane™ 5715 (B. F. Goodrich Inc) and aliphatic polyurethanes represented by Permuthane™ U6366 (Stahl Inc.). A key element in the choice of a binder is that the binder must not form free radicals that would interfere with the amino acid signal upon exposure to ionizing radiation.

The binder can be present at between 10 and 80 wt. % of the final radiation absorbing material layer. Most preferably the binder is present at between 35 and 50 wt. % of the final layer so as to provide optimum flexibility while still allowing a high coverage of the amino acid.

The support can be any suitable material. According to various embodiments, the support can be flexible, stiff, hard, compliant, or can have areas with different properties. The support can be polymeric, paper, ceramic, glass, metal, a composite, or a combination thereof. For example, the support for the dosimeter may be any one of a number of plastic supports such as polyethylene film, polyamide film, polyimide film, triacetate film, polypropylene film, polycarbonates, cellulosic supports, and polyester supports. The support can be paper, including rag or pulp paper, processed paper such as photographic paper, printing paper including but not limited to coated paper and art paper, baryta paper, and resin-coated paper. According to various embodiments, the support can be sufficiently flexible to be wrapped around a rod of 0.5 to 0.6 cm (0.1875–0.25 inch) diameter without showing signs of cracking, crazing or other damage. The support can be resistant to the effects of coating solvents and normal ambient conditions. The support is preferably a flexible plastic support. The preferred support is oriented polyester with a thickness of 2–14 mil. Most preferably, the polyester support can be within the range of 6–10 mil to provide reasonable stiffness for ease of handling while retaining flexibility for applications where bending of the dosimeter is required. The support can be clear in the preferred use, but white (pigmented with $TiO_2$ or $BaSO_4$) or colored supports can also be used. A primary requirement of the support, including the pigment or tinting material, is that it must not interfere with the signals generated by the radiation absorbing material. In the preferred embodiment, the support is clear (non-pigmented and undyed). The support can include an adhesion promoting sub layer to improve substrate wetting, the adhesion of the radiation absorbing material layer to the support, or a combination thereof.

Any suitable radiation absorbing material can be used, for example, an amino acid, provided that, on irradiation with ionizing radiation, the material produces radicals in proportion to the radiation dose received, and the radicals produced remain stable for a period of at least several hours so that the radical concentration can be read. A preferred radiation absorbing material is an amino acid. Most preferred is alanine.

If alanine is used, it can be in the L-alanine or L-methylalanine form. The crystalline amino acid material can have a particle size in the range of 0.1–200 microns before coating. In order to form the radiation absorbing material layer, crystals of amino acid, for example, L-alanine, are dispersed in solvent along with the binder. In general, the crystals are too large to be coated as they are received from the manufacturer and must be ground to smaller size. The particle size reduction can be accomplished by any standard method. Examples of such methods are dry grinding by means of a ball mill or attritor, wet milling by means of a media mill, rod milling, and hammer milling. Other methods such as precipitation, spray drying, and recrystallization are also useful. It is preferred that the particles are less than 100 microns in size. It is particularly preferred that the particles range between 1 and 40 microns in size.

Solvents for the dispersion may be any solvent that dissolves the binder, but solvents that evaporate quickly such as ketones (acetone, methylethyl ketone), alcohols (methanol, ethanol), acetates (methylacetate), and chlorinated solvents such as methylene chloride, are preferred. Acetone, methylene chloride, and mixtures of methylene chloride and methanol are particularly preferred.

Various addenda may be added to the mixture of binder and radiation absorbing material. Amorphous silica or alumina may be added in amounts from 0.1 to 5% of the weight of the radiation absorbing material, for example, alanine, to improve particle flow characteristics. Preferably silica is the flow additive and is added in amounts from 0.25–1% by weight of the radiation absorbing material. Surfactants may also be added in amounts from 0.01–1% by weight of the total dispersion as coating and leveling aids. Preferred coating aids are the silicone additives typified by DC1248 manufactured by Dow Corning Inc.

Coating of the radiation absorbing material layer can be done by common coating methods such as dip coating, roll coating, and extrusion hopper coating. The radiation absorbing material dispersion may be coated over the entire surface of the support, over only a portion of the support, or coated on a temporary support where the radiation absorbing material layer is a dosimeter. Particularly preferred for application of the alanine-containing dispersion to a support is the use of extrusion hopper coating. This type of coating is well known to be able to lay down precise amounts of dispersion resulting in reproducible coverages. After the dispersion is applied to the support, the coated layer is dried. Initial drying can be done at relatively low temperatures, such as from 20–35° C., with restricted airflow to prevent the occurrence of drying defects such as cells, cracks, orange peel, and the like. The initial drying can be followed by a second warming step at higher temperatures, from 50–120° C., where the layer is cured and any final amounts of solvent removed from the coating. The desired coating thickness is dependent on the radiation level and energy that are to be detected. The thickness of the radiation absorbing material layer can be from 5–300 microns. The preferred thickness is between 100 and 200 microns, and most preferably between 125 and 175 microns, where an excellent compromise between detectability and handling characteristics can be obtained. For certain applications, thinner radiation absorbing material layers can be preferred, and can be from 5–100 microns, for example 5–50 microns, or less.

The radiation absorbing material layer can be robust as formulated, however there may be occasions where a protective overcoat may be desirable. Such an overcoat can provide resistance to exposure to contamination and can protect the dosimeter from exposure to excessive moisture. As in the case of the binder, a primary requirement of the overcoat layer is that it must not generate free radicals upon irradiation whose EPR signal interferes with that of the radiation absorbing material. Material suitable for use in an overcoat layer can include acrylates, methacrylates, cellulosics such as cellulose acetate, polyesters, polyurethanes, and halogen-containing polymers and copolymers. The overcoat formulation can depend on the binder used for the radiation absorbing material layer. The overcoat formulation can be formulated such that the radiation absorbing material layer is not significantly disturbed by its application. The overcoat can be coated on, adhered to, or laid over the radiation absorbing layer. The overcoat layer can be held in place mechanically or by adhesion. The overcoat can be adhered to the radiation absorbing material layer, or to the support excluding the radiation absorbing material layer.

A protective covering can be formed of a separate material, such as a rigid polymeric or glass cover, that can be attached to the support permanently or removable. Such a cover can be hinged to expose the radiation absorbing material as needed. The cover can be transparent. If a separate cover is provided, it is preferably impact resistant.

The above describes the construction of the radiation absorbing material layer, and, if desired, the support, overcoat, and/or cover, that form a dosimeter. The dosimeter can further include an identification region. In this region may be printed such information as manufacturing lot number, a unique dosimeter identifier, calibration information and the like in the form of numbers, letters, symbols, bar codes, or a combination thereof. This information may be placed on the dosimeter by any means. For example, the information could be printed by means of an inkjet printer, thermal printer, pen, or stamp. Other means of printing can include gravure printing, offset printing, intaglio, laser etching, and chemical etching. Such printing can be done directly onto the radiation absorbing material layer, or, if present, on one or more of the support, the overcoat, the cover, or a combination thereof. The printing can be done on a label that can be affixed to one or more of the support, the overcoat, the cover, or the radiation absorbing material layer.

According to various embodiments, one or more additional coating can be added to the substrate, radiation absorbing material layer, overcoat, cover, or a combination thereof, to provide a base for printed information or layers which could be subsequently transformed. Examples of such layers would include silver-halide based photographic layers, thermally active imaging layers, and combinations of colored layers which could be etched or ablated to form characters, including transparent, white, black, colored, or reflective layers.

According to various embodiments, the identification region can be on a label that is adhered to the dosimeter. Many methods commonly known in the art may be used to provide the label for the radiation absorbing material dosimeter. Label materials such as paper, synthetic papers, and polymeric compositions, either filled or unfilled, can be used. Particularly preferred are paper label materials, including natural or synthetic papers, because of their inexpensive nature, flexibility, and ease of availability. Labels can be transparent, colored, white, or a combination thereof. Labels can be formed of reflective or metallic materials. Labels can include fluorescent, luminescent, or radioluminescnet materials as desired. Labels can also be formed of non-traditional materials, including liquid crystals, organic light emitting materials, and holographic materials.

Many adhesive systems are available for adhering a label to the dosimeter. Examples of such materials include pressure sensitive adhesives, hot melt adhesives, and thermally activated adhesives. The preferred adhesive system for this invention is a thermally activated adhesive. Thermally activated adhesives are solids and non tacky at room temperature, become adhesive and liquid at elevated temperature, and return to their non-tacky state upon cooling to room temperature. An example of a label material having the desired characteristics is 60# HMF Heat Seal 200 (Coating Specialty Inc.). The use of a non-tacky adhesive can be advantageous in manufacturing. If the adhesive layer is applied to the dosimeter during manufacture and before separating of a manufacturing web into separate dosimeters, the use of a thermally adhesive material prevents adhesion of the material to cutting equipment such as blades, dyes, and punches.

The label can be secured to a dosimeter mechanically rather then or in addition to adhesive attachment. Mechanical attachment can be done by use of retaining clips, pins, frames, screws, or other known fastening means.

The desired dosimeter information can be printed on a label in many ways. Examples of such printing include inkjet, gravure printing, thermal techniques (including use of direct or indirect thermal label materials), laser printing, laser ablation of applied ink, and laser or chemical etching. Preferred are methods that allow the printing of the label information once the label is attached to the dosimeter, such as during the finishing operations in manufacture wherein a web can be cut into multiple dosimeters. An example is laser ablation of an ink layer applied to the surface of the paper or plastic label material. This method consists of the following steps:
a) coating the label material with a colored ink layer providing a high contrast with the paper or plastic label substrate;
b) applying the label material to the dosimeter;
c) in predetermined portions that form an image, ablating away at least a portion of the colored ink layer using a laser.

Any colored coating can be applied onto the label substrate to provide the material to be ablated by the laser, so long as a print contrast is achieved between the coating and the label substrate that allows reading of the image after laser ablation. Highly preferred are conventional black inks or coatings containing carbon black or a black dye when a light colored label substrate is used. Both solvent-based and aqueous-based coatings of inks or dyes can be used. The colored coating can be applied to completely cover the label substrate, or to only partially cover it. The coverage is not critical, provided that the layer provide sufficient laser energy absorption to allow necessary ablation to form the desired image, for example, a dark coating can provide a reflectance when read at 700 nm that is less than about 5%. Excessive coating thicknesses (those greater than about 10 $g/m^2$) should be avoided, as these require more laser ablation to remove.

For laser ablation or etched labels, an intermediate layer can be applied between the label substrate and the colored coating, wherein the intermediate layer is of sufficient thickness that the ablation or etching of all of the coating at any one place can remove at least some of the intermediate layer without unduly distorting the underlying label support. It is unimportant whether this intermediate layer is applied all at once or in layers, provided a sufficient thickness is achieved. The intermediate layer can also prevent the colored layer from soaking into the label substrate, which would make obtaining a clean image very difficult. The actual minimum thickness of the intermediate layer required will vary, depending upon certain factors, including, for example, the power and effectiveness of the laser that is used, and the ability of the intermediate layer to be ablated or etched. The intermediate layer can be colored the same as the label support or the colored layer, or can be of a contrasting color to one or more of the label support or the colored layer.

Any coating technique can be used independently to apply the intermediate layer and the colored layer to the label support. For example, conventional extrusion hopper coating, multi-slot dies, or multi-station hoppers can be used, preferably using a single pass to make each of the two layers. Other coating techniques can include blade coating, gravure coating, extrusion, or other known methods, including printing methods.

Any laser capable of ablating the colored coating without ablating all of the intermediate layer is useful. Highly preferred for such purposes are conventional pulsed lasers that deliver high energy in one or more pulses within a short period of time. Most preferred are those that deliver at least 4 joules per $10^{-6}$ sec over an area of about 1.2 $cm^2$, such as $CO_2$ lasers. Conventional TEA $CO_2$ lasers are well known to be useful for this purpose, for example, as described in the article "Image Micro-machining with TEA $CO_2$ Lasers", Nelson et al, printed in 1975 in the SME Technical Paper identified as MR75-584. Still other useful lasers that deliver useful energy include pulsed YAG and scanning beam lasers such as continuous $CO_2$ or Q-switched YAG lasers.

The information content of the identification region can be in the form of alphanumeric characters, symbols, a barcode, or a combination thereof. It is highly advantageous if the information is in a form that is easily read by some sort of optical scanning device. It is preferred that at least a portion of the identification region contains a barcode for machine identification.

Barcodes can contain information including a unique identifier for the dosimeter, manufacturing information such as batch number or properties of the dosimeter, and mathematical parameters suitable for calculating exposure amounts of the dosimeter, such as described in U.S. Pat. Nos. 6,268,602; 5,767,520; and 5,637,876. This information can also be carried in alphanumeric and/or symbol form, but is more compactly indicated through a barcode.

Barcodes and their associated reading systems are widely known and used to facilitate manufacturing, shipment and inventory control of diverse goods, to assist in document control, and to aid in many additional tasks. Various barcode reading and laser scanning systems have been developed to scan and decode standard barcode formats and to generate digital representations to be used as inputs, typically, to computers for automatic processing and the like. Conventional barcode reading systems are discussed, for example, in U.S. Pat. No. 4,146,782 to Bamich; U.S. Pat. No. 4,542,528 to Sanner et al.; and U.S. Pat. No. 4,578,571 to Williams.

A wide range of information can be stored on the identification region at one or more times over the life of the dosimeter. For example, information can be encoded at the time of the dosimeter manufacture, for example, batch or property information allowing correct interpretation of dosimeter readings. Information regarding identification of an associated good can be encoded on the identification region when the label is associated with the good. For each occurrence of radiation of the good, information regarding the radiation can be encoded in the identification region. Information regarding the good can also be recorded, such as point of origin, destination, and any ports or storage facilities through which the good passes. Dates associated with shipment, radiation, or expected expiration of a good can also be encoded in the identification region.

Information stored in the identification region can be used to track a good. For example, shipment information, including place of origin and destination, can be included in the identification region, as well as a unique identifier that matches the goods to the dosimeter. The identification region of the dosimeter can then be read at any time to check that the dosimeter does in fact belong with the associated goods, to check the planned or actual shipment of the goods, and to see the amount of radiation to which the goods have been exposed.

It is important to note that many dosimeter materials record cumulative amounts of radiation. That is, multiple exposures produce a cumulative radiation exposure level in the dosimeter, rather than each radiation exposure wiping out a previous radiation exposure level. In this manner, the dosimeter records total radiation exposure, and can be used to ensure a product has been exposed to the correct amount of total radiation. This is important as different countries have different radiation level requirements for different agricultural, biological, and manufacturing goods, as well as for different industrial or medical uses, such as nuclear reactors or radiation facilities.

The identification region of a dosimeter can contain a unique identifier for the dosimeter, which identifier can be recorded electronically or manually. For example, a database of dosimeter identifiers can be maintained, and their respective associated goods recorded. Such a system can be used to track goods internationally or intranationally, as well as tracking irradiation of the goods. The system could be accessible by internet or any other network system. This would be useful, for example, for customs agents, radioactive site management, and research purposes.

The dosimeter can be resistant to increased temperatures, for example, exposure to temperatures of 70° C., for periods of time of at least 30 minutes. The materials, such as the inks in the identification region, and the support, can withstand exposure to such temperatures without softening, running, smearing, or degrading.

As described herein, a dosimeter can be made by coating a material, wherein the dosimeter includes the coated material and optionally a support, an overcoat, a cover, or a combination thereof. The dosimeter can also include an identification region encoding information, for example, shipment information, radiation levels, radiation dates, and expiration dates, as well as information regarding proper calibration and reading of the dosimeter. Such a dosimeter can be useful in tracking goods and their irradiation levels to comply with various national standards.

EXAMPLES

Examples of the Invention

1. Preparation of the Support

A roll of clear, polyester support of seven mil thickness and bearing an adhesion promoting sub layer was mounted to one of the unwind spindles of a Riston HRL 24 laminator. On the other unwind spindle was mounted a roll of 60# HMF Heat Seal 200 (Coating Speciality Inc.) paper label stock bearing a thermally activated adhesive on one side and a black ink layer and intermediate layer printed on the other side. The paper label stock was laminated to the polyester base by passing the two supports through the heated rolls of the laminator at a speed of 3.6 meters (12 ft) per minute and a temperature of 110 degrees centigrade. The paper label material showed excellent adhesion to the polyester base.

2. Preparation of the Alanine Dispersion 224 grams of Estane™ 5715 were added to 1296 grams of methylene chloride and 144 grams of methanol and stirred until polymer was completely dissolved. To the polymer solution was added to 336 grams of L-alanine (Kyowa Hakko Inc.) and 1.0 grams of a silicone-based coating aid (DC 1248, Dow Corning Inc.). The resulting dispersion was passed through a media mill containing 0.2 cm (0.08 inch) diameter glass beads at a loading of 70% of the empty volume of the chamber. The rate at which the dispersion was passed through the mill was determined by measuring the particle size of the initial output from the mill and adjusting mill parameters (agitator speed and liquid throughput) to give the desired particle size distribution. The median particle size of the final dispersion was about 25 microns. The solids content of the dispersion was adjusted to between 25 and 30 percent to provide a coating viscosity of 500–1000 cps.

3. Coating of the Alanine Dispersion

The alanine dispersion prepared above was applied to the support by means of an extrusion hopper fed by a gear pump. The pumping rate was adjusted to give a coating thickness of about 130 microns. The coated alanine layer was dried in the coating machine through the use of forced warm air drying. Drying was done in stages with the initial drying being at lower temperatures 25–35° C., and reduced airflow, and the final drying being at 80–100° C. The support with its coated alanine layer was then wound in a roll.

4. Finishing of the Alanine Dosimeter Strips

The support coated in Step 3 above was mounted on to a precision chopping device. The support was fed through the guillotine blade of the chopper and strips of 4 mm width produced.

5. Writing of the Identification Information

A barcode and a series of alpha numeric characters sufficient to identify a dosimeter strip was written on to the label using a carbon dioxide laser to ablate the black ink which had been coated onto the label stock. The laser was a $CO_2$, flying-spot device run at 10 watts with a write speed of 51 cm (20 inches) per second. The barcode written was successfully scanned by several barcode readers typical of those in common use.

Comparative Example 1

Strips of the clear, 7 mil polyester support used above were cut to the same size as the dosimeters of the invention to demonstrate that the substrate did not provide signals which would distract from the signal obtained from the alanine.

Comparative Example 2

A solution of 15 gms of Estane™ 5715 were added to 76.5 grams of methylene chloride and 8.5 grams of methanol and stirred until polymer was completely dissolved. The polymer solution was coated onto the clear, 7 mil polyester support used above using a draw knife with a gap of 10 mils. The resulting coating was air dried at ambient conditions and then finally dried in a forced air oven at 65° C. Strips of the coated polyester support were cut to the same size as the dosimeters of the invention to demonstrate that the combination of the substrate and Estane binder did not provide signals that would distract from the signal obtained from the alanine.

Comparative Example 3

A molded alanine pellet was obtained from Gamma Service Produktbestrahlung GmbH to show that the signal obtained from the dosimeter of the invention were comparable to those existing in the art.

Testing of the Alanine Dosimeter Strips

A. EPR Signal

The dosimeter strips and alanine dosimeter pellet were irradiated to a level of 20 kGy using a $cobalt_{60}$ radiation source. After irradiation, the dosimeter strips comparative examples were examined using an EPR spectrometer (Bruker Biospin™). The signal results are shown in Table 1.

| Example | EPR Signal |
| --- | --- |
| Comparative Example 1 | None |
| Comparative Example 2 | None |
| Comparative Example 3 | $1.85 \times 10^3$ |
| Invention Example 1 | $4.21 \times 10^3$ |

B. Flexibility Test

Alanine dosimeters of Example 1 were wrapped around a series of rods of decreasing diameters to demonstrate flexibility. Dosimeters were wrapped with the coated side facing the rod and with the coated side away from the rod. After wrapping, the dosimeters were unwrapped and examined for cracking, crazing, or other signs of damage. Rod diameters of 2.54 cm (1 inch), 1.27 cm (0.5 inch), 0.95 cm (0.375 inch), and 0.64 cm (0.25 inch) were used and none of the invention dosimeters showed any signs of damage.

The invention has been described in detail with particular reference to certain preferred embodiments thereof, but it will be understood that variations and modifications can be effected within the spirit and scope of the invention.

What is claimed is:

1. A dosimeter comprising:
   at least one first region, the first region comprising a coated radiation absorbing material capable of measuring an absorbed dose of ionizing radiation, wherein the radiation absorbing material is L-alanine;
   at least one identification region comprising an identification mark.

2. The dosimeter of claim 1, wherein the L-alanine is in crystalline form.

3. The dosimeter of claim 2, wherein the L-alanine is in crystalline form.

4. The dosimeter of claim 1, wherein the first region is between 5 and 300 microns thick.

5. The dosimeter of claim 1, wherein the first region is between 5 and 100 microns thick.

6. The dosimeter of claim 1, wherein the first region is between 100 and 200 microns thick.

7. The dosimeter of claim 1, wherein the first region further comprises a binder.

8. The dosimeter of claim 1, further comprising a support, wherein the first region is on the support.

9. The dosimeter of claim 8, wherein the identification mark is on the support, the first region, or a combination thereof.

10. The dosimeter of claim 1, further comprising a protective overcoat over the first region.

11. The dosimeter of claim 10, wherein the identification mark is on the protective overcoat, the first region, or a combination thereof.

12. The dosimeter of claim 1, further comprising a protective cover over the first region.

13. The dosimeter of claim 12, wherein the identification mark is on the protective cover, the first region, or a combination thereof.

14. The dosimeter of claim 1, wherein the identification mark is thermally printed, laser printed, ink jet printed, or gravure printed.

15. The dosimeter of claim 1, wherein the identification mark is on a label, and a labeled area of the dosimeter forms the identification region.

16. The dosimeter of claim 15, wherein the label has a thermally activated adhesive for adhesion to the dosimeter.

17. The dosimeter of claim 1, wherein the identification mark is formed by laser ablation.

18. The dosimeter of claim 1 wherein the identification mark comprises a bar code, an alphanumeric character, a symbol, or a combination thereof.

19. The dosimeter of claim 18, wherein the identification mark comprises an intermediate layer and a colored layer, and wherein the bar code, alphanumeric character, symbol, or combination thereof is formed by an absence of at least the colored layer.

20. A method of measuring an absorbed dose of ionizing radiation comprising:
   providing a dosimeter of claim 1;
   exposing the dosimeter to a dose of ionizing radiation sufficient to cause the radiation absorbing material to produce radicals; and
   detecting the radicals.

21. The method of claim 20 wherein the radicals remain stable for at least 3 hours.

22. The method of claim 20, further comprising:
comparing the detected amount of radicals to a prescribed radiation level, and
repeating the steps of exposing the dosimeter to a dose of ionizing radiation and detecting the radicals until the prescribed radiation level is reached.

23. A method of tracking radiation exposure in a good, comprising:
associating a dosimeter of claim 1 with the good, wherein the dosimeter has a unique identifier recorded in the identification region;
recording the identifier of the dosimeter and its association with the good.

24. The method of claim 23, wherein the recording is in a database.

25. The method of claim 23, wherein the database is accessible through a network or internet.

26. The method of claim 23, further comprising:
exposing the good with the associated dosimeter to radiation;
reading the unique identifier of the dosimeter;
verifying the association of the dosimeter with the good; and
determining an amount of radiation absorbed by the dosimeter.

27. A good comprising a dosimeter of claim 1.

28. The good of claim 27, wherein the dosimeter is permanently attached to the good.

29. The good of claim 27, wherein the dosimeter is removably attached to the good.

30. The good of claim 27, wherein the good is an agricultural product, a biological product, a person, an animal, a polymer, or an item undergoing security scanning.

31. A tracking system for a good, wherein the good has an associated dosimeter of claim 1, the dosimeter having a unique identifier recorded in the identification region of the dosimeter, wherein the system comprises:
at least one data base for recording the good and the unique identifier of the dosimeter associated with the good.

32. The tracking system of claim 31, wherein the unique identifier is a bar code, and the system further comprises at least one bar code reader.

33. The tracking system of claim 31, further comprising at least two computers, wherein each computer can access the database.

34. The tracking system of claim 31, wherein the database is accessible through a network or internet.

35. The tracking system of claim 31, wherein a radiation exposure level of the good as determined from the dosimeter is recorded in the database.

* * * * *